United States Patent
Broberg et al.

(10) Patent No.: US 10,462,414 B2
(45) Date of Patent: Oct. 29, 2019

(54) METHOD AND SYSTEM FOR GENERATION OF CAPTIONS OVER STEREOSCOPIC 3D IMAGES

(71) Applicant: CABLE TELEVISION LABORATORIES, INC., Louisville, CO (US)

(72) Inventors: David K. Broberg, Lafayette, CO (US); So Vang, Broomfield, CO (US); Arianne T. Hinds, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1625 days.

(21) Appl. No.: 13/832,129

(22) Filed: Mar. 15, 2013

(65) Prior Publication Data
US 2013/0201283 A1    Aug. 8, 2013

Related U.S. Application Data

(63) Continuation-in-part of application No. 12/651,273, filed on Dec. 31, 2009, now Pat. No. 9,049,431.

(51) Int. Cl.
| | | |
|---|---|---|
| *H04N 7/18* | (2006.01) | |
| *H04N 7/088* | (2006.01) | |
| *H04N 13/156* | (2018.01) | |
| *H04N 13/183* | (2018.01) | |

(52) U.S. Cl.
CPC ......... *H04N 7/0882* (2013.01); *H04N 13/156* (2018.05); *H04N 13/183* (2018.05)

(58) Field of Classification Search
CPC ... H04N 7/0882; H04N 13/004; H04N 13/007
USPC ...................................... 348/43, 51; 382/154
See application file for complete search history.

(56) References Cited

U.S. PATENT DOCUMENTS

| | | | |
|---|---|---|---|
| 2005/0089212 A1 | 4/2005 | Mashitani | |
| 2007/0230781 A1* | 10/2007 | Yamamoto | G06K 9/00711 382/173 |
| 2009/0278986 A1 | 11/2009 | Ikegami | |
| 2010/0074594 A1 | 3/2010 | Nakamura et al. | |
| 2010/0157025 A1 | 6/2010 | Suh | |
| 2010/0165083 A1 | 7/2010 | Sasaki et al. | |
| 2010/0188572 A1 | 7/2010 | Card, II | |
| 2011/0242104 A1* | 10/2011 | Zhang | H04N 13/183 345/419 |

\* cited by examiner

*Primary Examiner* — Jayanti K Patel
*Assistant Examiner* — Richard B Carter
(74) *Attorney, Agent, or Firm* — Great Lakes Intellecutal Property, PLLC

(57) ABSTRACT

Management of graphical overlays for use in stereoscopic video where the graphical overlay is positioned relative to depths associated with objects showing in the video. A disparity offset processor may be configured to facilitate generating overlay mapping information as a function of object depth maps in order to facilitate positioning one or move graphical overlays relative to corresponding objects.

17 Claims, 9 Drawing Sheets

METHOD AND SYSTEM FOR GENERATION OF CAPTIONS OVER STEREOSCOPIC 3D IMAGES

CROSS-REFERENCE TO RELATED APPLICATIONS

This application is a continuation-in-part of U.S. application Ser. No. 12/651,273, filed Dec. 31, 2009, the disclosure of which is incorporated in its entirety by reference herein.

TECHNICAL FIELD

The present invention relates to managing graphical overlays for stereoscopic video, such as but not necessarily limiting to managing position of the graphical overlays relative to objects showing within the video.

BACKGROUND

FIG. 1 schematically illustrates display of a caption 10 over a two-dimensional (2D) image 12 included as part of a television program showing within a television screen 14. The illustration depicts a situation in which the caption 10 may be used to provide a textual description of a dialogue or other audio taking place within the television program. The caption 10 is shown to be at the side of the image 12 for exemplary purposes. The caption 10 may be directly over the image 12 to prevent viewing of the covered portion of the image 12. This process is commonly referred to as closed captioning when the caption 10 is used to textually describe audio events taking placing within the television program. The particular positioning of the caption 10 within the television screen 14 may be defined according to an x-axis and y-axis of the screen 14 in which the caption 10 is to appear, i.e., x and y values may be used represent a placement location of the caption 10 respectively within the x-axis and y-axis of the screen 14, such as the placement defined according to ANSI-CEA-708, which is hereby incorporated in its entirety. The caption 10 is then added to the video frames used to render the image 12 at the location specified with the 2D coordinates. This type of 2D placement coordinate may work well for placing the caption 10 relative to 2D images but is problematic when used to place the caption 10 near 3D images.

The rendering of 3D images is typically accomplished in a stereoscopic manner by rendering separate left and right viewpoint images such that the images from each viewpoint appear independently to each eye as a 3D object. Since a caption 10 added according to the 2D coordinate system will be added to part of the left viewpoint portion of the frame and part of the right viewpoint image of the frame, the 3D television displays the left and right viewpoint images independently such that only the portion of the caption 10 within each viewpoint is displayed at the same time. This essentially creates a 3D image that overlaps the two portions, rendering the closed caption text illegible.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
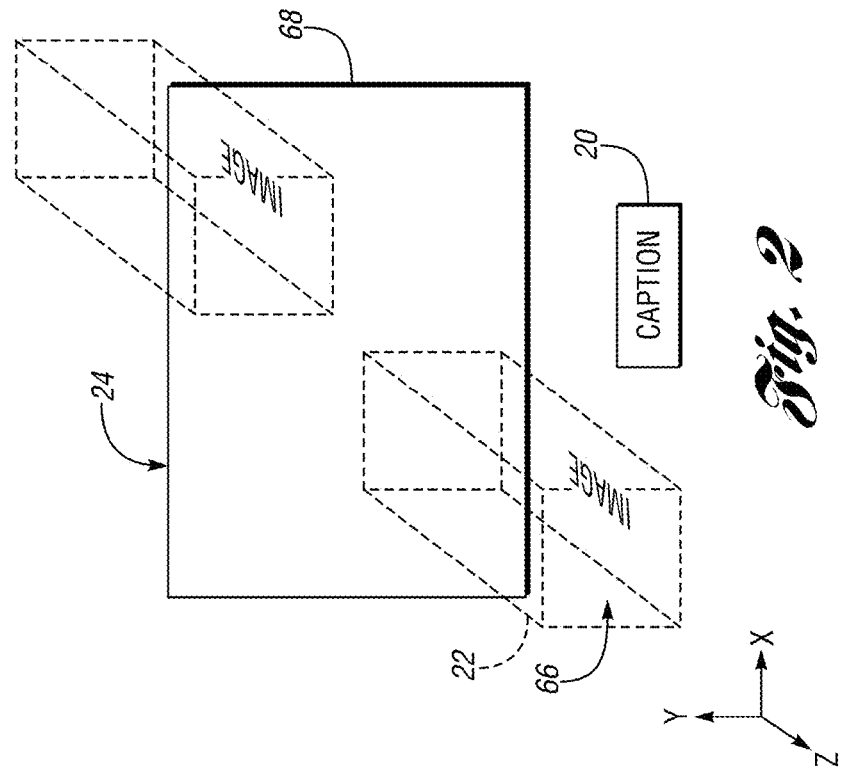
FIG. 2 illustrates a caption displayed over a three-dimensional (3D) image in accordance with one non-limiting aspect of the present invention.
Figure 1:
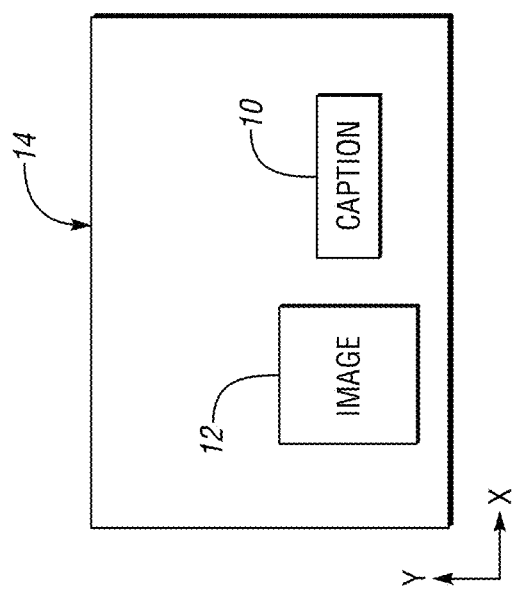
FIG. 1 schematically illustrates a caption displayed over a two-dimensional (2D) image.

FIG. 2 illustrates a caption 20 displayed over a three-dimensional (3D) image 22 shown within a display 24 in accordance with one non-limiting aspect of the present invention. The caption 20 may be generated such that it appears to be parallel with or in front of the 3D image 22. This presentation is believed to be advantageous in that it allows a viewer to see the caption without the caption disrupting the presentation of the 3D image 22. (The caption 20 is shown to be at a side of the image for exemplary purposes. The present invention fully contemplates an area behind the caption 20 including 3D images.) The caption 20 may be redrawn to appear in each of the left and right viewpoint portions of each video frame prior to output such that the entire caption appears regardless of whether the left or right viewpoint is currently showing.

Figure 3:
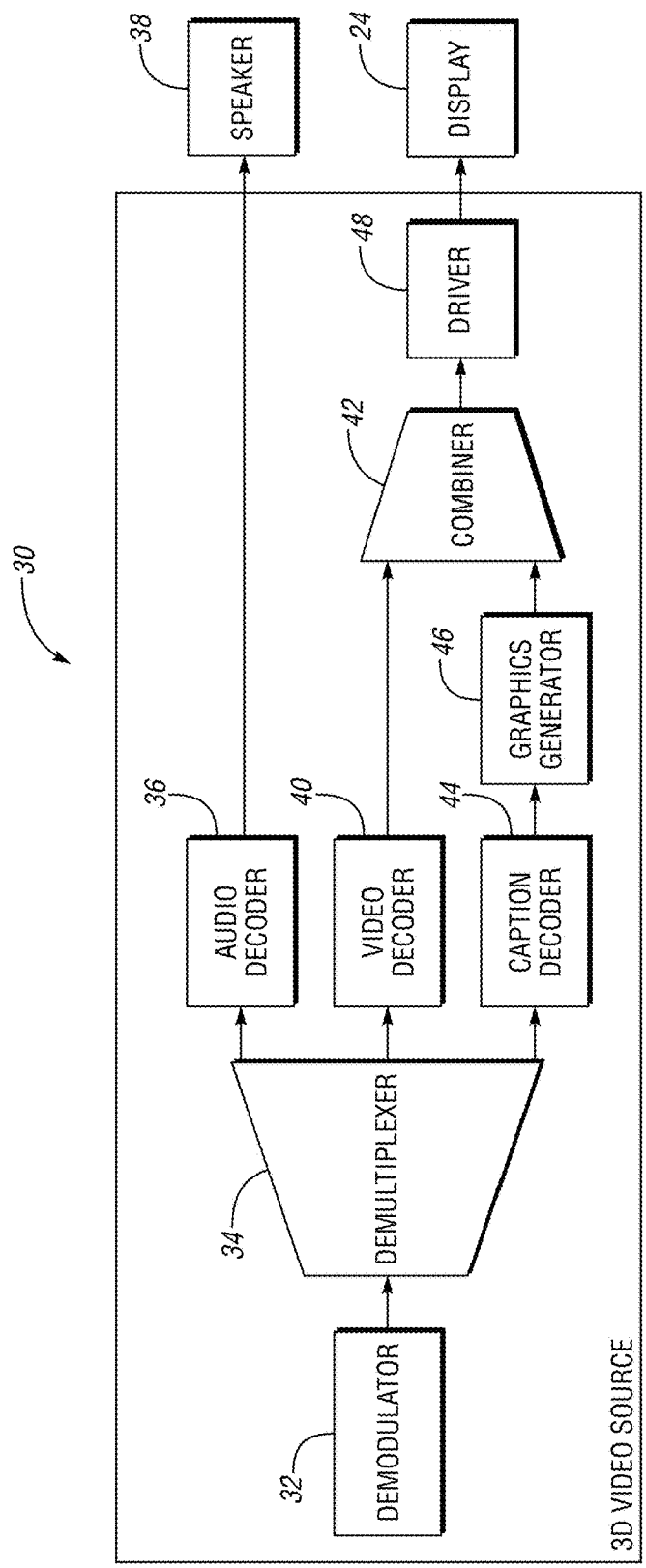
FIG. 3 illustrates a 3D video source configured to generate a caption in accordance with one non-limiting aspect of the present invention.

FIG. 3 illustrates a 3D video source 30 configured to generate the caption 20 in accordance with one non-limiting aspect of the present invention. The operation of the source 30 is described with respect to supporting output of 3D images to the display 24 of the type that relies on a stereoscopic presentation of left and right viewpoints, such as that provided by a settop box (STB), Blue-Ray player, etc. The source 30 may be configured to support generating the caption 20 during playback of a television program or other video based image. While the present invention is predominately described with respect to generating the caption over 2-view stereoscopic 3D television images, the present invention is not intended to be so limited and fully contemplates generating the caption 20 relative to any other type of 3D image, including multiview, autostereoscopic 3D images.

The source 30 may include a demodulator 32 to demodulate signals received from a service provider (not shown), disc/media player, or other source of content. The service provider may be a multiple system operator (MSO) or other entity that provides subscription based services to one or more subscribers, such as but not limited to a cable, satellite, or broadcast television service provider; a telephone/telephony service provider; and/or a high-speed data service provider. The source 30 also applies to an arrangement where the demodulator 32 may be configured to operate with some form of packaged media or removable memory element such as a BD player in which the demodulator function may differ depending upon the source of the content. The captions 20 generated according to the present invention may be adapted to the service associated with each service provider and the user interface devices necessary to access the same. In the case of supporting television based signaling, the demodulator 32 may be a tuner or other device configured to demodulate signals received over the particular communication medium of the television service provider, i.e., wireline (cable) or wireless (satellite, broadcast) mediums.

A demultiplexer 34 may be included downstream of the demodulator 32 to demultiplex the signals output from the demodulator 32. Television signals may be transported according to any number of communication protocols and standards. Moving Pictures Expert Groups (MPEG) is one standard that may be used to facilitate transmission of television based video. MPEG defines transportation of multiple element elementary streams (ESs) within a single transport stream (TS). In the case of supporting MPEG or some other multiplexed communication strategy, the demultiplexer 34 may be configured to demultiplex one or more of the ESs included in the TS output from the demodulator. For illustrative purposes, only ESs associated with audio, video, and captions are shown even though the system 30 may be configured to demultiplex and process other ESs.

An audio decoder 36 may be included to process the audio signals for output to a speaker 38. A video decoder 40 may be included to process the video signals for output to a combiner 42. A caption decoder 44 may be included to process caption signals for output to a graphics generator 46. The graphics generator 46 may be configured to generate textual or other graphical representation to be included as part of the caption 20. In the case of closed captioning, the graphics generator 46 may be configured to generate text that matches audio sounds being conveyed during the television program. This graphical representation may be based on corresponding data included with the caption signals transported to the source 30, i.e., based on data included in the caption ES of the TS such as that defined by ANSI/CEA-708. The graphics generator 46 may also be configured to generate graphical elements, text, advertisement, logos, and other types of graphical icons according to the design of user-interface and other application software in the source 30.

The combiner 42 may be configured to combine the output of the graphics generator 46 with the video output from the video decoder 40. A driver 48 may then interface the video with the display used to render the 3D image. Depending on the configuration of the display 24, the device driver 48 may be required to output the resulting video such that each frame includes a particular orientation of left and right viewpoint images, i.e., the device driver may be required to output the video according to a spatial reduction technique (side-by-side, above-and-below, checkerboard, etc.), in temporal reduction technique, or some other spatial reduction technique. The device driver 48 or the combiner 42 may include a 3D pre-formatting element (not shown) to facilitate the processing and reformatting of left and right viewpoint images as transmitted into different formats of spatially multiplexed or temporally multiplexed video frames as required by the display 24.

Figure 4:
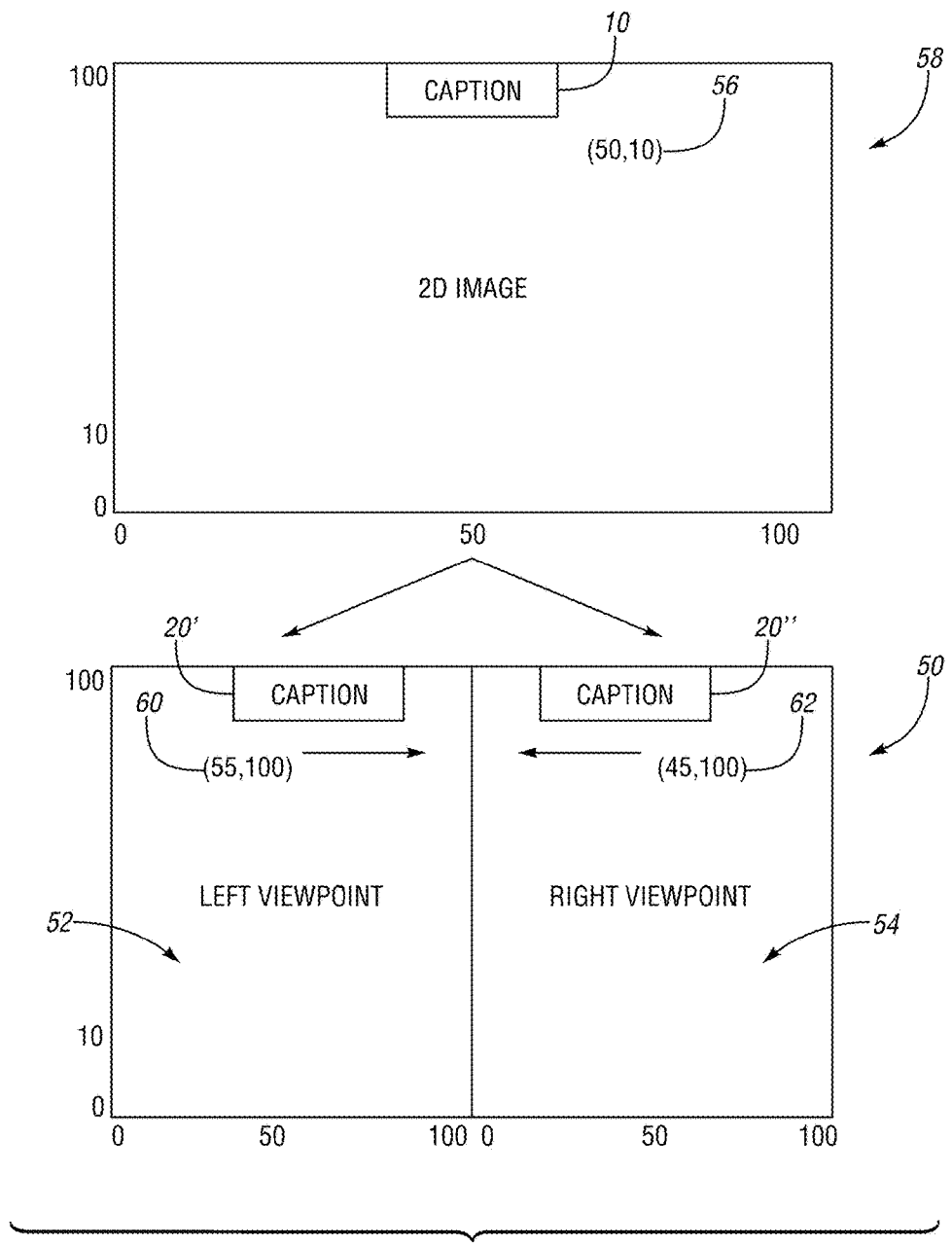
FIG. 4 illustrates a video frame output in accordance with one non-limiting aspect of the present invention.

The combiner 42 may be configured to add/combine the caption output from the graphics generator 46 to each of the left and right viewpoint images included within each video frame output to the display 24. FIG. 4 illustrates a video frame 50 output from the combiner 42 after redraw of the caption 20 in accordance with one non-limiting aspect of the present invention. The video frame 50 in the example is configured to operate with the display 24 requiring a side-by-side spatial reduction of left and right viewpoint images 52, 54. The caption 20 is redrawn to appear in both of the left and right viewpoint images 52, 54 based on a 2D coordinate placement 56 specified within the caption 20 information included with the TS, i.e., with the caption ES. A 2D image frame 58 included in the upper portion of FIG. 4 to illustrate placement of the caption 10 if the caption 10 were to be added to 2D video being output to a 2D display.

The placement of the captions 20 redrawn in accordance with the present invention may be adjusted relative to the 2D placement coordinates 56 used with the 2D video frame. For the purpose of one non-limiting aspect of the present invention, it is assumed that the captions 20 used were created using the present (2D) caption standards, without any special ability to convey placement other than in the 2-dimensional axis (X:Y), no Z-axis data is available in the caption stream. To create the appearance shown in FIG. 2 where the caption 20 appears to be in front of the 3D image 22, the left viewpoint caption 20' is shifted to the right and the right viewpoint caption 20" is shifted to the left. The caption 20' redrawn within the left viewpoint image 52 may be assigned a corresponding first placement location 60 and the caption 20" redrawn within the right viewpoint image 54 may be assigned a corresponding second placement location 62. The graphics generator 46 may use these placements 60, 62 when generating the caption video output to the combiner 42 for combination with the video output from the video decoder 40. The amount by which each caption 20', 20" is shifted may be selected depending on a forward end 66 (see FIG. 2) of the image plane so that the resulting caption 20 appears to be in front of the 3D images 22. This determination may be based on the characteristics of the display 24 and its operating capabilities. Optionally, the graphics generator 46 and/or the combiner 42 may be configured to assess these characteristics and to select an appropriate adjustment to the placement locations 60, 62.

Figure 5:
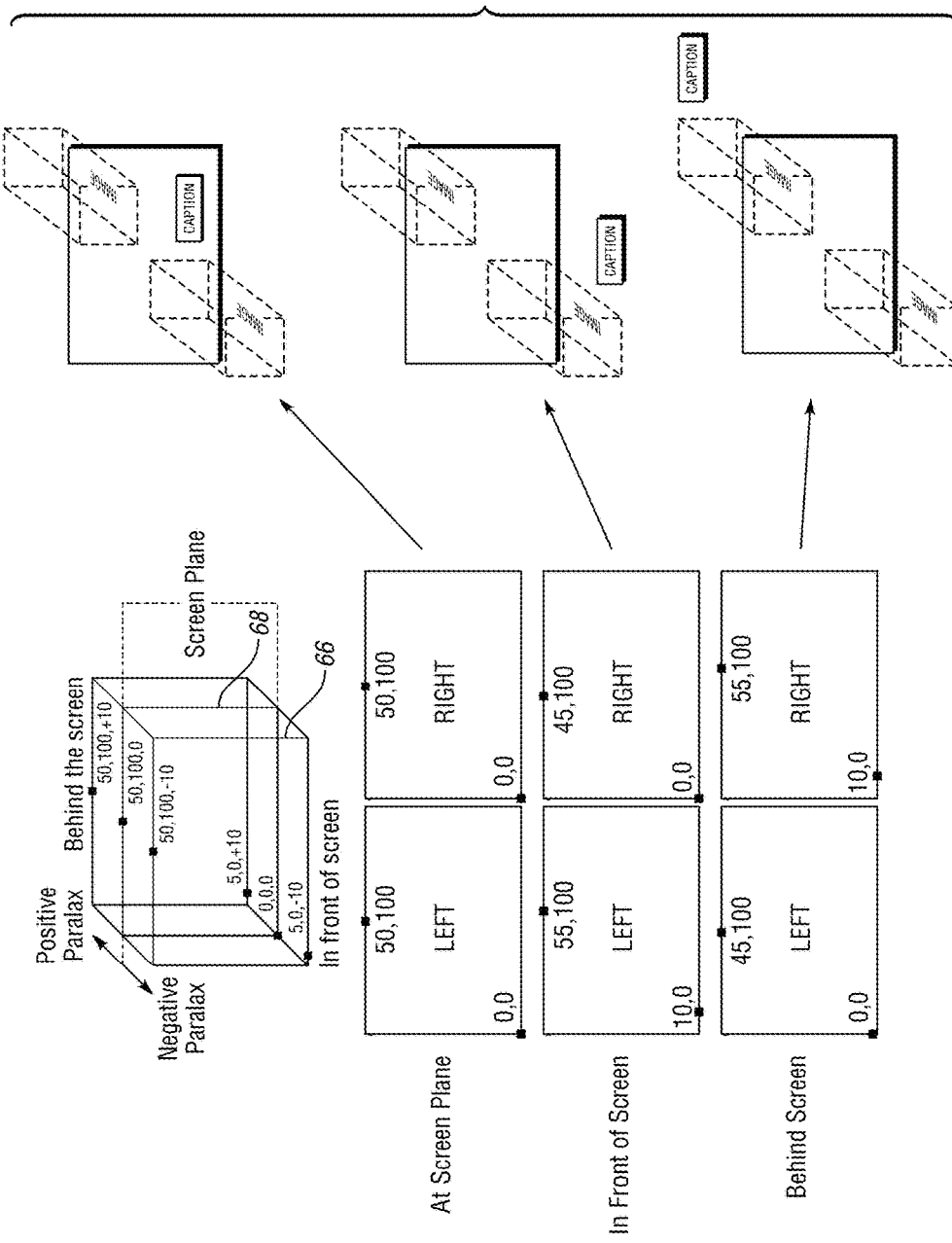
FIG. 5 illustrations a parallax relation of a caption generated in accordance with one non-limiting aspect of the present invention.

The adjustments made by the present invention may be understood relative to the x and y coordinate values 56 typically used to define placement of the caption 20 within the 2D image frame 58. The x and y values 56 associated with that caption 20 may be used to define of an x-axis and y-axis placement location 60, 62 for a window or other feature used to display the caption 20. In accordance with the present invention, these x and y values 60, 62 may be adjusted to re-position a copy of the caption 20', 20" within the left and right viewpoint, spatially reduced video frames 52, 54 so that the resulting caption 20 appears to a viewer to be in front of a screen plane 68. FIG. 5 illustrations this relation as defined relative to a z-axis (positive parallax and negative parallax) as measured from the screen plane 68 relative to the viewer. The parallax of the caption 20 may be increased by controlling the relative offset of each of the redrawn captions 20', 20" to each other, i.e., the depth may increase (caption moves closer to viewer) as the captions 20', 20" are shifted farther away from the predefined 2D coordinates 56.

The 2D coordinates 56 used to define placement of the caption 10 relative to a 2D image (see FIG. 4) may be defined relative to a 100 unit coordinate system such that placement of the caption 10 approximately corresponds with an x value of 50 and a y value of 100. This would place the caption 10 at a top, center of the screen when output at the screen plane. Since the 3D video frame is used to generate separate full-images for each of the left and right viewpoints, the same 100 unit coordinate system is reproduced within each half of the side-by-side reduction. (The size of the caption 20', 20" may be corresponding adjusted to reflect the halving necessary to support the illustrated spatial reduction.) In a temporally reduced system, the reproduction of the same coordinate system within the illustrated halves would not be necessary since the entire frame would be used to represent one of the left or right viewpoint images 52, 54.

Regardless of whether left and right viewpoint images 52, 54 are temporally, spatially or otherwise reduced according to the needs of the output device, the placement of the captions 20', 20" within each of the left and right viewpoint images 52, 54 may be shifted relative to each other in accordance with the present invention to adjust the resulting appearance of the caption 20 relative to the produced 3D images 22. As shown in FIG. 4, the x values are the only adjusted value and each value is adjusted to produce a difference of 10 units between each caption depending on whether a negative or positive parallax of 10 units along the z-axis is desired. The amount of parallax may be selected by the graphics generator 46 based on the parallax of the 3D images being shown. This may include the graphics generator fixing the parallax through an entire program and/or continuously/dynamically adjusting the parallax with changes in parallax of the 3D images being shown, adjusting the parallax according to user inputs, and/or adjusting the parallax according to other messages send to the graphics generator.

Figure 6:
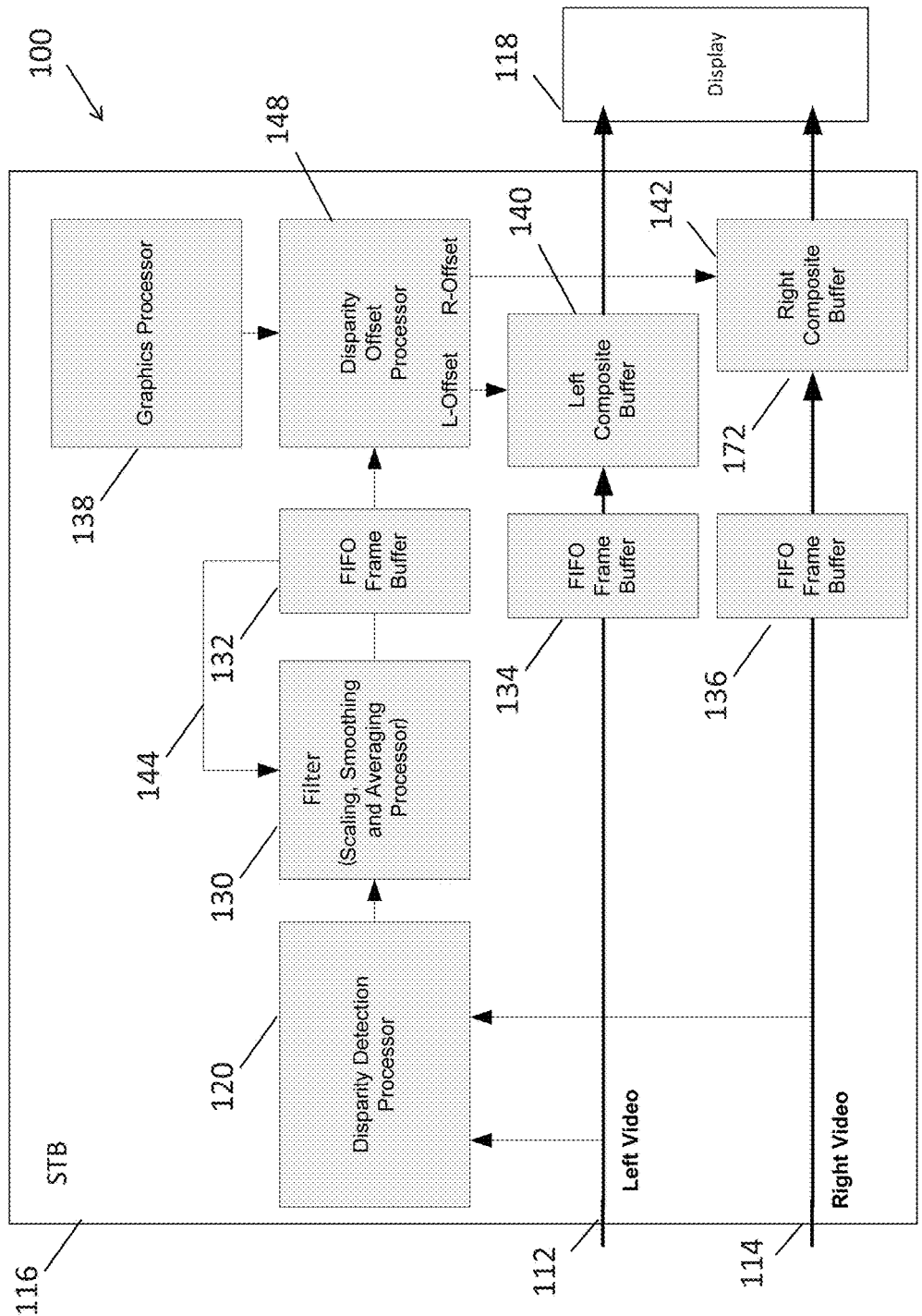
FIG. 6 illustrates a system for managing graphical overlays in accordance with one non-limiting aspect of the present invention.

FIG. 6 illustrates a system 100 for managing graphical overlays in accordance with one non-limiting aspect of the present invention. The system 100 may be configured to facilitate positioning or otherwise controlling insertion of graphical overlays to be added to stereoscopic/3D video. The system 100 is predominately described with respect to stereoscopic 3D video that outputs the video as altering left and right images, however, the present invention is not necessary so limited and fully contemplates the use of other stereoscopic video arrangements, such as but not necessary limited to other spatial and/or temporal reduction techniques (e.g., side-by-side, above-and-below, checkerboard, etc.). The images comprising the stereoscopic video may be delivered as a plurality of image frames associated with a corresponding one of a left video input 112 and a right video input 114. The left video input 112 and the right video input 114 may be generated with a demodulator, a demultiplexer and/or some other combination suitably configured to retrieve the stereoscopic video from a particular transmission medium.

A set-top box (STB) 116 is shown to facilitate processing the left video input 112 and the right video input 114 for output to a display 118. Optionally, the formatting requirement of the display 118 may be determined in the manner described in U.S. patent application Ser. No. 12/502,434, the disclosure of which is hereby incorporated by reference in its entirety. The STB 116 is described for exemplary non-limiting purposes to demonstrate the use of the present invention with stereoscopic video transmitted over a cable television median, a broadcast television medium, an optical television medium, a satellite television medium or other medium where a device processes the stereoscopic video prior to output to the display 118. The STB 116 or the capabilities/components associated therewith may be included within a standalone device connected to the television using a High-Definition Multimedia Interface (HDMI) cable or other suitable connection. While this exemplary standalone configuration is shown, the present invention fully contemplates integrating the illustrated capabilities/components with the display 118, i.e., with a television, computer, tablet, a cellular phone or other device having the display or otherwise configured to facilitate interfacing the stereoscopic video with a viewer or with another device designed to transmit the stereoscopic viewer with a graphical overlay to a viewer.

Figure 7:
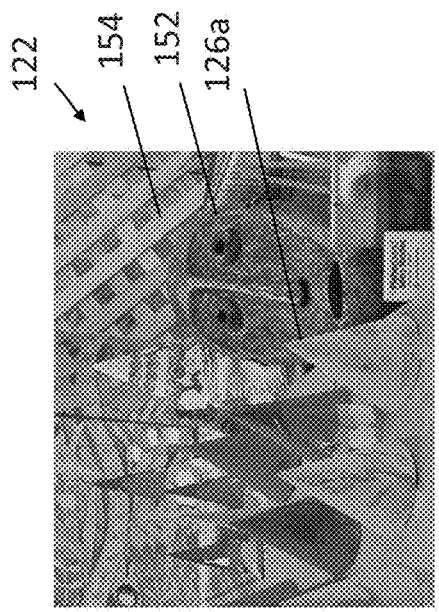
FIGS. 7 and 8 illustrate exemplary left image and right images in accordance with one non-limiting aspect of the present invention.
Figure 8:
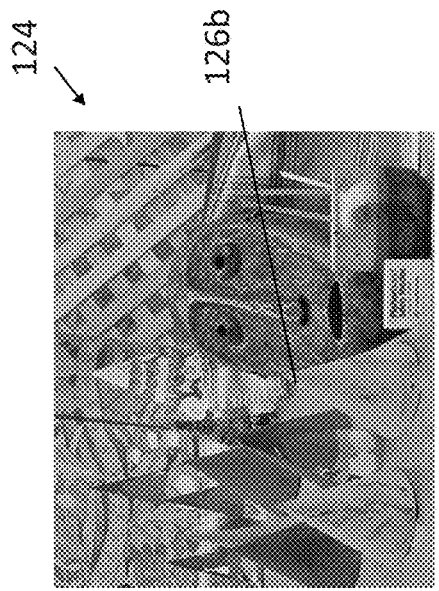

A disparity detection processor 120 may be configured to capture samples of the left video input 112 and the right video input 114. The sampling may correspond with the disparity detection processor 120 capturing the individual images or frames comprising the left video input 112 and the right video input 114 as the corresponding images are being pass-through for further processing for output to the display 118. FIG. 7 illustrates an exemplary left image 122 and FIG. 8 illustrates an exemplary right image 124 as captured with the disparity detection processor 120 in accordance with one non-limiting aspect of the present invention. The left and right images 122, 124 may include a plurality of objects where the corresponding objects (e.g., 126a) in the left image 122 are positioned slightly offset from the corresponding object (e.g., 126b) in the right image 126 in order to generate the desired parallax. The disparity detection processor 120 may include image segmentation software, edge assessment capabilities or other object detection capabilities sufficient to facilitate individually identifying the plurality of objects included within each of the left and right images 122, 124. The disparity detection processor 120 may be configured to continuously capture left and right images at a speed corresponding with the speed at which the left and right images are being transmitted through the left video input 112 and right video input 124, e.g., at 30 images/frames per second (or at faster or slower speeds).

Figure 9:
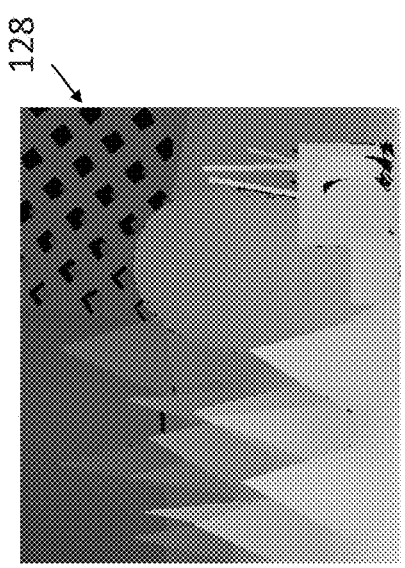
FIG. 9 illustrates a monochromatic image generated in accordance with one non-limiting aspect of the present invention.

The disparity detection processor 120 may be configured to generate disparity maps as monochromatic images or other exemplifications sufficient to represent relative disparity between the objects included within the captured images. FIG. 9 illustrates one such monochromatic image 128 generated for one of the captured images where the disparity map 128 is represent according to a color-coded gray scale. The gray scale may be used to differentiate relative depth of the objects according to a color value assigned to each pixel of the monochromatic image. For exemplary non-limiting purpose, the disparity detection processor 120 may be configured to assign each image pixel a value between 0 and 255 to indicate depth of corresponding object, e.g., a value closer to 0 (lighter) may be used to indicate the object is closer (negative parallax) to the viewer and a value closer to 255 (darker) may be used to indicate the object is farther from the viewer (positive parallax). Of course, the present invention is not necessarily limited to the use of monochromatic images as the disparity maps 128 and fully contemplates other processes for generating disparity information sufficient to represent depth, parallax or other values indicative of relative positioning of objects within an image/frame.

A filter 130 may process the disparity maps output from the disparity detection processor 120. The filter 130 may be configured to facilitate scaling, smoothing and/or averaging of the disparity maps in order to mask distortions and/or to scale the underlying disparity information (e.g., color-based values) to a uniform range. The filtered disparity maps may be output to a disparity first-in-first-out (FIFO) buffer 132 or other suitable time-delaying feature. The disparity FIFO buffer 132 may be timed relative to a left video input FIFO buffer 134 and a right video input FIFO buffer 136 to facilitate timing processing of the disparity maps relative to delivery of the corresponding images within the left and right video inputs 112, 114. The FIFO buffering may be used to ensure a graphical overlay generated with a graphics processor 138 for a particular image is positioned within the corresponding image being output. This may include timing delivery of the graphical overlay with a left composite buffer 140 and a right composite buffer 142 configured to perform final processing of left and right video inputs 112, 114 prior to output to the display 118. One non-limiting aspect of the present invention envisions the FIFO buffers 132, 134, 136 buffering video for multiple seconds in order to facilitate managing insertion of the graphical overlay according the contemplated process.

Figure 10:
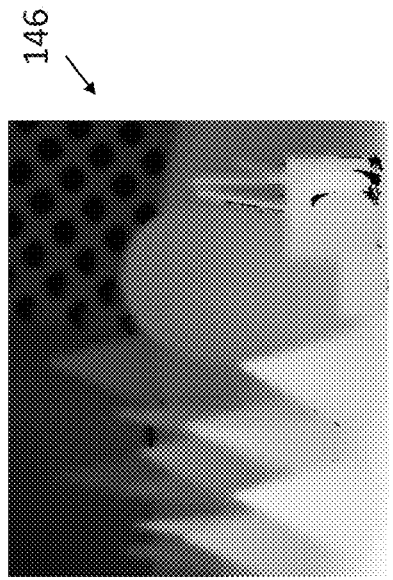
FIG. 10 illustrates a filtered disparity map in accordance with one non-limiting aspect of the present invention.

A feedback loop 144 may optionally be included to facilitate feedback of a preceding disparity map to the filter 130. The filter 130 may process one or more preceding disparity maps relative to a current disparity map in order to generate a filtered disparity map. FIG. 10 illustrates a filtered disparity map 146 in accordance with one non-limiting aspect of the present invention. The filtered disparity map 146 is shown to be slightly fuzzier that the un-filtered disparity map 128 shown in FIG. 9. The fuzziness associated with the filtered disparity map 146 may include less defined object edges resulting from the objects slightly shifting position between image/frames (e.g., objects may slightly change position from the preceding disparity map to the subsequent/current disparity map). The less defined objects may also correspond with smoothing and/or scaling introduced with the filter 130 to influence the granularity at which color changes are reflected, which can be beneficial in minimizing distortion and/or rapid changes in depth position. The preceding disparity map fed back to the filter 130 may itself have been previously filtered such that it corresponds with a filtered disparity map. Optionally, rather than feeding back a filtered disparity map, and un-filtered or raw disparity map (e.g. 128) for the preceding image may be fed back. The use of an un-filtered disparity map may be beneficial in avoiding tolerance accumulation and noise within the filtered disparity maps output from the filter 130.

The filtered disparity map may be provided to a disparity offset processor 148. The disparity offset processor 148 may be configured to facilitate compositing a graphical overlay generated with the graphics processor 138 to the left composite buffer 140 and the right composite buffer 142 in order to facilitate positioning the graphical overlay within desired portions of the left images and right images being output to the display 118. The disparity offset processor 148 may be configured to generate insertion instructions, positioning instructions or other information sufficient to achieve the desired positioning of the graphical overlay with the left composite buffer 140 and the right composite buffer 142. The disparity offset processor 148 may facilitate positioning the graphical overlay relative to any one or more of the objects identified within the filtered disparity map, i.e., the disparity offset processor may provide instructions sufficient to facilitate positioning the graphical overlay in front, behind or at any other depth of the stereoscopic video output. In this manner, the present invention contemplates facilitating 3D depth-based positioning of the graphical overlay relative to any one or more objects shown within the output 3D video. The depth of the graphical overlay may be controlled by shifting the graphical overlay added to the left composite buffer 140 relative to the graphical overlay added to the right composite buffer 142 such that the parallax effect achieves the desired depth relative to the desired object.

The graphics processor 138 may be configured to select one or more graphical overlays to be composited within the displayed stereoscopic video. The graphics processor 138 may include a network interface (not shown) to facilitate receiving overlay related instructions from an overlay controller, an advertisement controller or other device sufficient to identify the appropriate graphical overlay. The graphics processor 138 may identify a channel or other identifying information associated with the stereoscopic video tuned to by the STB 116 in order to identify the desired graphical overlay. Optionally, user preferences, history or other parameters may be identified to facilitate selection of the graphical overlay. The present invention is not intended to be necessary limited to the type of graphical overlay being composite within the stereoscopic video such that virtually any type of alphanumeric representation, image, caption, media or other informational conveying means may be used to form the graphical overlay. The present invention, for example, contemplates generating multiple graphic overlays for the stereoscopic video, such as but not necessary limited to facilitating displaying advertisements simultaneously with closed captioning, rolling text, banner ads and the like.

The disparity offset processor 148 may facilitate delivering the one or more desired graphical overlays to the left composite buffer 140 and the right composite buffer 142, optionally with the format or representation of the graphical overlay sent to the left composite buffer 140 and the right composite buffer 142 differing according to desired 3D effects. The disparity offset processor 148 may be configured to time delivery of the particular graphical overlays relative to the buffering provided with the disparity FIFO buffers 132, 134, 136 in order to ensure the positioning information generated from a particular filtered disparity map is used to position the graphical overlay relative to the corresponding left image and right image being received at the left and right composite buffers 140, 142 for output to the display 118. In the event the system 100 is being used to facilitate playback of real-time video, the video may be buffered by an amount of time sufficient to facilitate the contemplated management of the graphical overlay insertion such that the resulting stereoscopic video output to the display 118 may be delayed in time relative to the real-time occurrence of the stereoscopic video. Optionally, the time delay induced with the buffering may include coordination with secondary devices used to facilitate interactions with the stereoscopic video in order to avoid occurrence of spoilers, i.e., to prevent applications executing on the secondary device from executing operations in time with the real-time video instead of the buffered video.

Figure 11:
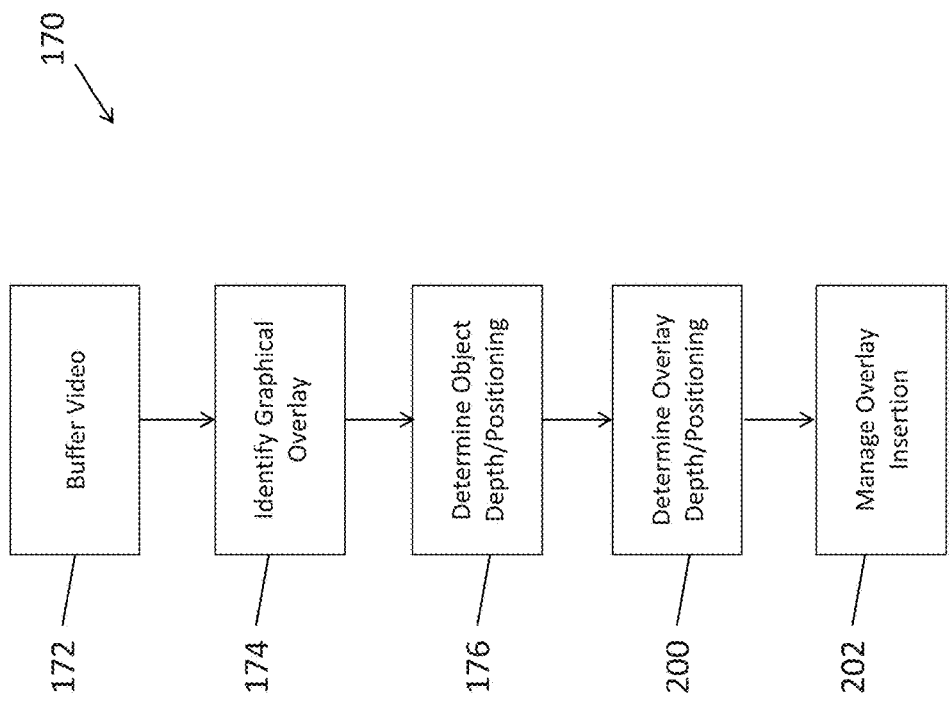
FIG. 11 illustrates a flowchart of method for managing graphical overlays in accordance with one non-limiting aspect of the present invention.

FIG. 11 illustrates a flowchart 170 of method for managing graphical overlays in accordance with one non-limiting aspect of the present invention. The method may be embodied in a computer-readable medium, and/or computer program product, having non-transitory instructions stored thereon, which are operable with a processor or other logically executing device, to facilitate the contemplated graphical overlay management. While the method is predominately described with respect to leveraging use of the system 100 illustrated in FIG. 6 to facilitate the insertion of graphical overlays within stereoscope video, this is done for exemplary non-limiting purposes as the present invention fully contemplates its use with other types and configurations of systems and its use in managing graphical overlays for other types of media besides stereoscopic or 3D video. As described in more detail below, one aspect of the contemplated method relates to locally processing video to assess objection position, depth, movement, etc. and capitalizing on the locally generated information to facilitate management of graphical overlays.

The method is predominately described with reliance on graphically processing performed with the disparity offset processor when 148. The processing is illustrated with respect to the disparity offset processor 148 generating or otherwise mapping depth information gleaned from disparity maps output from the disparity detection processor 120. This may include assessing object depth relative to overlay depth in order to calculate desired positioning (x, y, z) for the graphical overlay(s) within the left and right images. The description is provided with respect to insertion of a single graphical overlay within a single image for exemplary purposes as the present invention fully contemplates the disparity offset processor 148 performing similar processing for any number of graphical overlays and images, optionally simultaneously. The description is also provided with respect to the disparity offset processor 148 generating maps, lines and other graphically orientated references to demonstrate calculation of parameters used to manage overlay insertion without necessarily intending to limit the scope and contemplation of the present invention. The illustrated features are shown merely to demonstrate information being collected, calculated and/or otherwise processed with the disparity offset processor 148 when managing graphical overlay insertion. The disparity offset processor 148 need not necessarily generate such mappings in order to achieve the results contemplated by the present invention.

Block 172 relates to buffering video. The video may be buffered for a period of time sufficient to enable the processing of captured images and the subsequent insertion of a graphical overlay within the actual images from which the captured images were taken. The video may be buffered with the described disparity, left and right FIFO buffers 132, 134, 136 or with other suitable buffering devices, such as but not necessarily limited to a digital video recorder (DVR), personal video recorder (PVR), network DVR, etc. Timestamps, image identifiers or other frame-based identifiers may be assessed or generated to differentiation particular images from each other. The images being buffered may correspond with those transmitted according to Moving Pictures Expert Group (MPEG) or other suitable image/frame transmission protocols. While the buffering is shown to be achieved with the disparity, left and right FIFO buffers 132, 134, 136, the buffers 132, 134, 136 need not necessarily be standalone buffers and instead may be incorporated into other components of the STB 116 or other device through with the stereoscopic video is processed for output to the display 118.

Block 174 relates to identifying the graphical overlay desired for insertion within the stereoscopic video. The graphical overlay identification may include configuring a size, shape, appearance and other parameters for the graphical overlay. Such formatting of the graphical overlay may be tailored to the output capabilities of the output device and/or the stereoscopic operation requirements of the display. The identification of the graphical overlay may also include identifying one or more objects relative to which the graphical overlay is to be displayed. With respect to the illustrations shown in FIGS. 7 and 8, certain graphical overlays may be desired for positioning relative to one or the cones 126 and other graphical overlays may be desired for positioning relative to the mask 152 and/or the background lattice 154. The identification of the object relative to which the graphical overlay is to be displayed may beneficial in allowing advertisements to be positioned relative to particular products, to facilitate displaying player information relative to particular players and/or to facilitate any number of location specific conveyance of information. Optionally, a generic object position may be specified, such as a generic specification that the graphical overlay appear in front of a nearest object within an image, behind a farthest object within an object or another location that is not tied to specific type of object.

Figure 12:
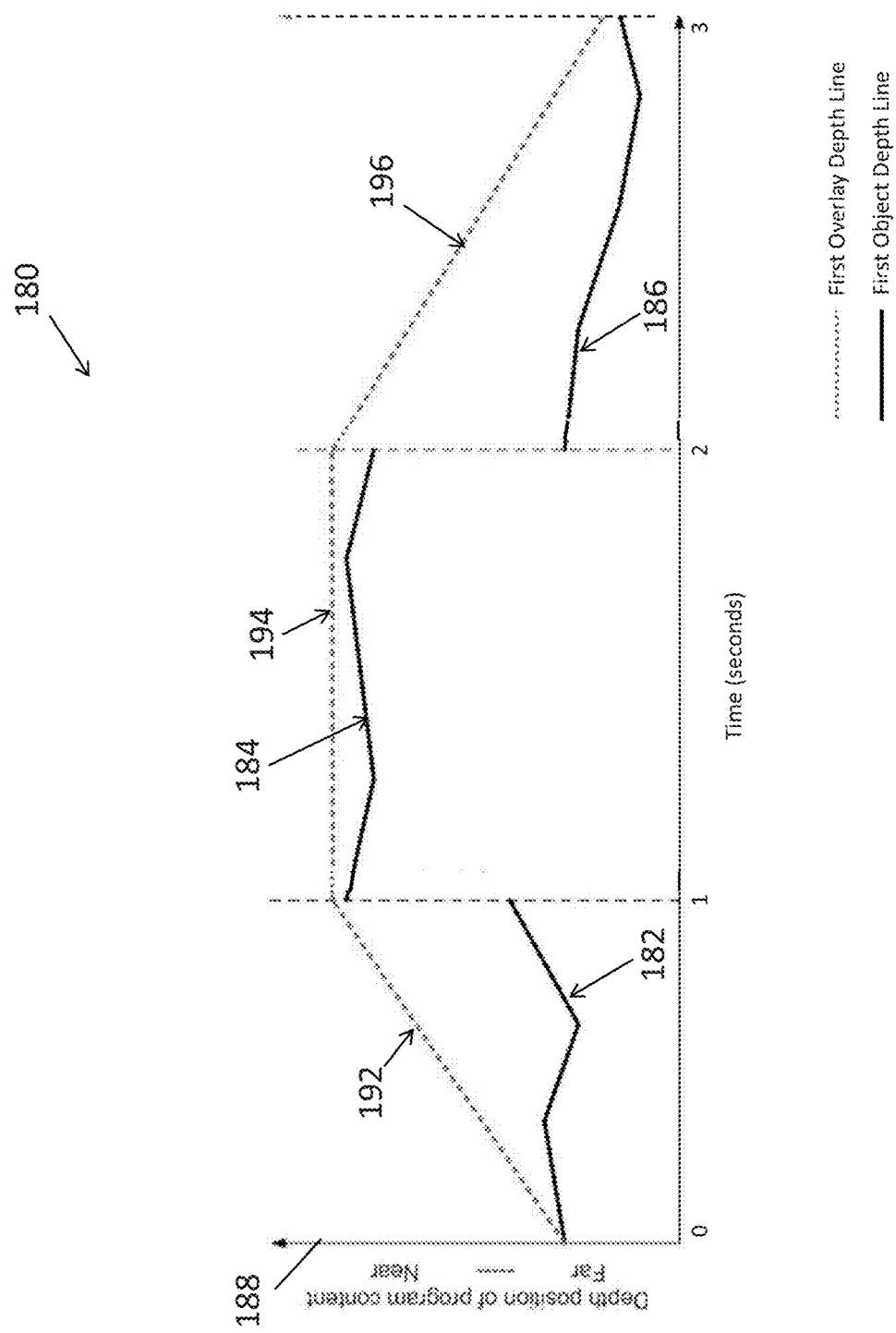
FIG. 12-13 illustrate graphical representations of information generated to assess depth in accordance with one non-limiting aspect of the present invention.

Block 176 relates to determining object depth/positioning information for the object relative to which the graphical overlay is to be displayed. The method is predominately described with respect to facilitating positioning of the graphical overlay in front of the nearest object. The object depth mapping described below may correspond with identifying the nearest object within each image as a function of the disparity maps. This is done without necessarily intending to limit the scope and contemplation of the present invention as similar depth mapping may be generated for any one or more objects besides the nearest object. FIG. 12 illustrates a graphical representation 180 of information generated to assess object depth in accordance with one non-limiting aspect of the present invention. The object depth information is shown graphically, however as noted above, the present invention is not necessary limited to generating such graphical representations and fully contemplates calculating similar information without the necessity of rendering the corresponding graphical representation.

The method is predominately described with reliance on graphically processing performed with the disparity offset processor when 148. The processing is illustrated with respect to the disparity offset processor 148 generating or otherwise mapping depth information gleaned from disparity maps output from the disparity detection processor 120. This may include assessing object depth relative to overlay depth in order to calculate desired positioning (x, y, z) for the graphical overlay(s) within the left and right images. The description is provided with respect to insertion of a single graphical overlay within a single image for exemplary purposes as the present invention fully contemplates the disparity offset processor 148 performing similar processing for any number of graphical overlays and images, optionally simultaneously. The description is also provided with respect to the disparity offset processor 148 generating maps, lines and other graphically orientated references to demonstrate calculation of parameters used to manage overlay insertion without necessarily intending to limit the scope and contemplation of the present invention. The illustrated features are shown merely to demonstrate information being collected, calculated and/or otherwise processed with the disparity offset processor 148 when managing graphical overlay insertion. The disparity offset processor 148 need not necessarily generate such mappings in order to achieve the results contemplated by the present invention.

The graphical representation 180 illustrates a first object depth line (solid line) to reflect object depth for a nearest object included within the filtered disparity maps (see FIG. 10) input to the disparity offset processor 148. While only the first depth line is illustrated, similar object depth lines may be included for any additional objects of interest or objects identified to be associated with the particular graphical overlay. The first depth line may be characterized as a depth map for the nearest object appearing within the filtered disparity maps. The first depth line is shown to be divided into a plurality of segments corresponding with one second intervals of time such that a first segment 182, a second segment 184 and a third segment 186 are illustrated. Each of the segments 182, 184, 186 may be used to map the depth of the first object across a plurality of images occurring during the corresponding time interval. In the event the images are processed for output to the display at 30 images per second, each of the segments 182, 184, 186 would comprise depth information generated from 30 images, i.e. 30 filtered disparity maps.

Optionally, the first depth line may be segmented into the illustrated first, second, and third segments 182, 184 and 186 using other markers or references besides the number of frames and/or elapse time. The first depth line, for example, may be segmented based on scene changes and/or other events occurring within the stereoscopic video. The disparity detection processor 120 or other device feature having capabilities to assess object positioning may be configured to identify scene changes to occur when a sudden or abrupt change in object depth occurs, such as that occurring at the one second interval between the first segment 182 and the second segment 184. The partitioning of the first object depth line, and thereby the first, second and third segments 182, 184, 186, or additional segments, may be beneficial in facilitating placement of the graphical overlay in a manner that tracks scene changes, such as to ensure a smooth transition or movement of the graphical overlay in anticipation of up-coming scene changes. In this manner, the scene changes may be identified before the corresponding scene changes are actually output to the display 118 such that the partitioning may occur in response to scene changes and before output of the corresponding video.

The depth of the first object is illustrated along a vertical depth axis 188. Vertical elevational changes in the first object depth line indicate relative movement of the first object across each of the graphed images (e.g., 90 images/frames if output at 30 frames/second). The first object depth line is shown to experience sharp changes in elevation at a first boundary and a second boundary (vertical dashes), which may be attributed to a change in camera angle or other action in the stereoscopic video resulting in the nearest object (first object) becoming nearer to the view, such as the above noted scene changes. The first and secondary boundaries are shown to correspond with the one second interval and the two second interval for exemplary purposes as the boundaries may vary according to other intervals. Optionally, the boundaries may be based on object movement, such as according to scene change recognition where object movements are compared to a threshold associated with scene changes. The length between boundaries may vary depending on the number of scene changes such that more frequent scene changes may produce shorter lengths between boundaries than infrequent scene changes.

A first overlay depth line (dashed line) is shown to illustratively represent positioning of the graphical overlay relative to the first object depth line. The elevation of the first graphical overlay may be selected by the disparity offset processor 148 or otherwise implemented such that the overlay position for each frame may be related to a correspond position along the first overlay line, thereby defining positioning of the first graphical overlay for the corresponding image frame. In this manner, like the first object depth line, the first overlay depth line may be used to characterize an overlay depth map for the graphical overlay. The first overlay depth line may include a first portion 192, a second portion 194 and a third portion 196 corresponding with each of the first segment 182, the second segment 184 and the third segment 186. The first, second and third portions 192, 194, 196 may be shaped differently from the corresponding first, second and third segments 182, 184, 186.

The shaping is shown to correspond with linear sections having a consistent slope from a beginning (left side) of the corresponding portion 192, 194, 196 to an ending (right side) of the corresponding portion 192, 194, 196. The first, second and third portions 192, 194, 196 need not necessarily be configured with the consistent slopes per portions 192, 194, 196 and instead may include other shapes. Optionally, the overlay depth line, or individual portions 192, 194, 196, may be shaped with less undulations or less severe changes than the corresponding first, second and third segments 182, 184, 186, i.e., with a non-linear but smoother shape. The first overlay depth line may be generated after measuring the entire length of the first depth line, i.e., after the illustrated three seconds or other buffering interval has elapsed. This may be done in order to shape the first overlay depth line in anticipation of upcoming frames to ensure the individual portions 192, 194, 196 are gradually sloped from an ending of the preceding portion 192, 194, 196 to a beginning of a following portion 192, 194, 196.

The anticipation-based shaping of the first overlay depth line may be beneficial in preventing sudden changes in the depth appearance of the overlay to a viewer, e.g., preventing the overlay from suddenly moving toward or away from the viewer. The disparity offset processor 148 may be configured to shape each portion 192, 194, 196 such that the beginning and endings thereof are sloped relative to the nearest appearing object within the corresponding beginning and ending frame and/or the ending of the first object depth line in the preceding portion 192, 194, 196 and the beginning of the object depth line in the succeeding portion 192, 194, 196. The first overlay depth line may be shaped to ensure the sloping defined between the beginning and ending of the corresponding portion 192, 194, 196 is sufficient to ensure the line remains above any peak or undulation within the corresponding segment 182, 184, 186, which may include adjusting line elevation. Optionally, in the event sudden changes or frequent changes in the overlay depth are acceptable, the first overlay depth line may be shaped to more closely track the shape of the corresponding first object depth line, such as by setting an offset value or slight elevational difference between the portions 192, 194, 196 and the corresponding segments 182, 184, 186 and otherwise allowing the overlay to follow movement of the closet object.

Figure 13:
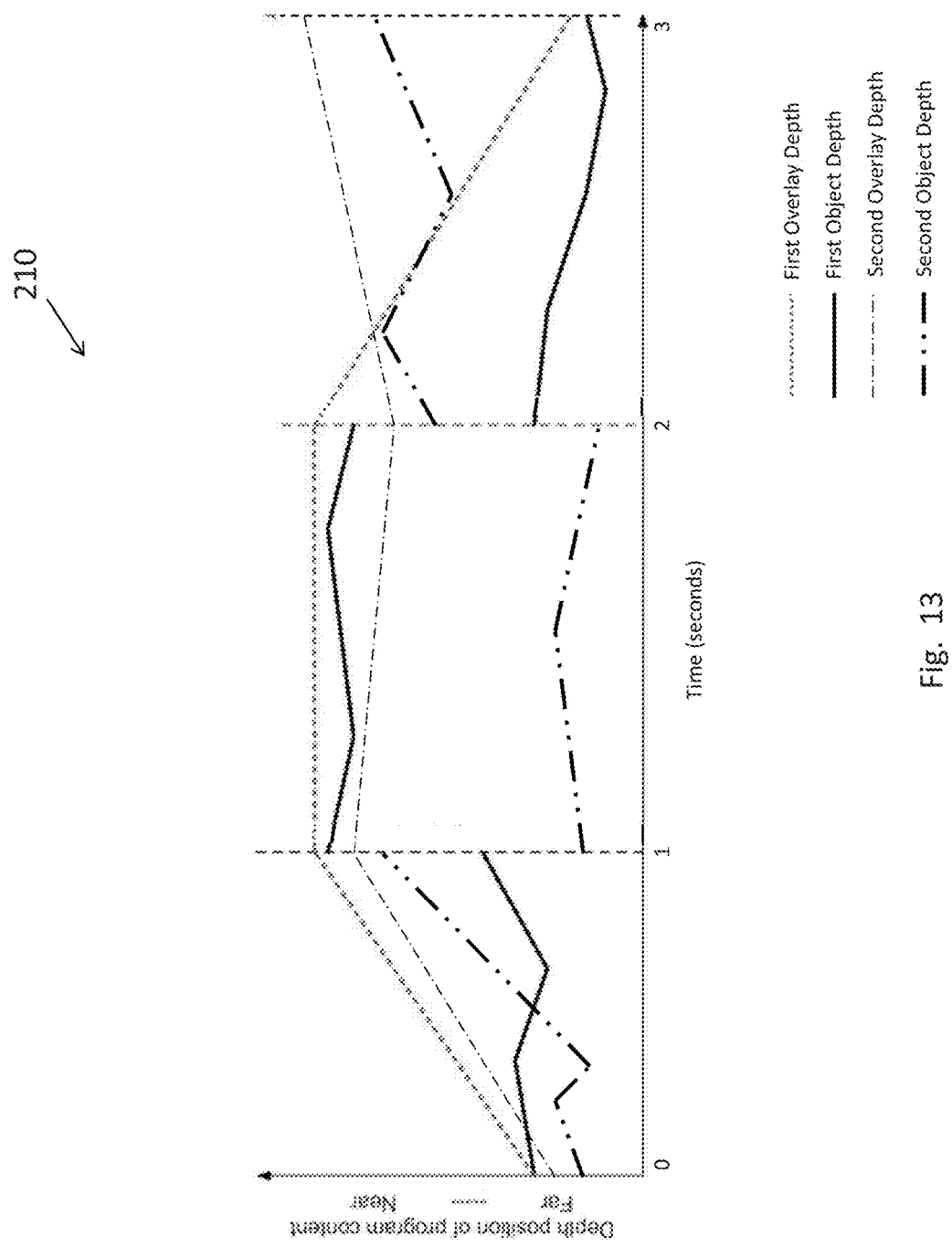

Returning to FIG. 11, Block 200 relates to determining depth and/or other positioning information to facilitate compositing the graphical overlay with the left and right composite buffers 140, 142. The first overlay depth line may be used to identify depth defining information for the graphical overlay relative to each of the output images. Additional information may be included to facilitate x, y, z positioning within the output images, i.e., to facilitate positioning the graphical overlay in front of the nearest object at a bottom, top, right, left or other portion of the stereoscopic video. The ability of the present invention to generate depth and other positioning information allows the graphical overlay, or multiple graphical overlays, to be positioned to appear within a desirable portion of the output video. FIG. 13 illustrates a graphical representation 210 of positioning information generated to facilitate positioning a first graphical overlay relative to a first overlay depth line while simultaneously positioning a second graphical overlay relative to a second overlay depth line. Block 202 relates to generating the necessary insertion instructions, positioning parameters, timing controls, etc. needed to properly manage insertion of the desired one or more graphical overlays within the output stereoscopic video.

As supported above, the present invention relates to a solution for generating captions (or graphics) over spatially multiplexed stereoscopic 3D images. This may include supporting caption placement within a system that relies on transmission of separate left and right viewpoints to construct a stereoscopic image. One solution proposed by the present invention is to redraw the text twice within each of the two sub-pictures, once for the left-eye half and again for the right-eye half of the image. Now when the two half images are processed by the 3D display processor they both contain the full text information for each eye, making them fully readable again. In this solution, when the captions are placed at the screen plane (zero parallax) there is no problem for portions of the image with positive parallax, however, when the captions are placed at the screen plane that intersect portions of the picture with negative parallax, there may be a depth conflict (visual paradox), which may negatively influence the 3D effect. The use of captions in this way may negatively influence the 3D effect and any extended exposure to this type of depth conflict may cause headaches and eyestrain. One solution proposed by the present invention is to render the captions in Z-space so that they appear to float in front or behind of any elements of the stereoscopic content. This may be accomplished by shifting the generated graphical (or text) elements in opposite directions for each half of the multiplexed stereoscopic image.

The text (or graphic overlay) that appears on the left-eye view may be shifted horizontally to the right while the text (or graphic overlay) for the right-eye view may be shifted to the left an equal amount away from the assigned target location. The degree or magnitude of this offset may be proportional to the resolution of the screen and the projected size of the image. The exact value may be adjusted with a user-control for the most comfortable viewing, while still minimizing the edge conflicts with any portion of the content that experiences negative parallax. Alternatively, a separate depth signal may be provided with the caption stream, which may be used by the display generator to control the off-set of the respective left and right text images, and/or data associated with multiple 2D coordinates specified for different placement locations may be processed to generate a desired z-depth according to relative differences in the specified 2D placement locations.

The present invention may be advantageous in that it may enhance the delivery a high-quality stereoscopic 3D experience to those viewers who chose to utilize the on-screen display of closed-captions during the program. Another non-limiting aspect of the present invention contemplates providing "open-captions" on a separate program stream that could be selected by the viewer where the caption text has been properly placed in the 3D space in advance by the programmer and delivered as a separate file. While this alternate method may be effective for stored content, it may less applicable to live programming and it may cost more to support transmissions of a duplicate stream.

One non-limiting aspect of the present invention contemplates actively managing graphical overlay placement in 3D-space to avoid depth space conflicts with underlying 3D video content by using modified real-time disparity detection from left and right view source material.

The generation of depth map data from stereoscopic pairs may be created in accordance with the present invention to facilitate converting disparity data associated with objects in a stereo pair to corresponding depth map. The present invention leverages the use of real-time depth map conversion along with storage and display processing to control placement of locally generated graphics in Z-space over live 3D programming and other types of stereoscopic video/media to avoid depth conflicts.

In one non-limiting aspect of the present invention, the stereo-pairs are submitted to the disparity detection processor, which generates a monochromatic image representing relative disparity between the objects. Optionally, this type of disparity map can be further smoothed and filtered to mask distortions and scaled to a uniform range which can be considered the depth map of the image. A new depth map frame may be produced for every video frame in the stereo content sequence and is sent to FIFO frame buffers. This multi-tap delay line may be used to offer several seconds of cumulative delay for the video path and the depth maps. The depth map path may include a feedback loop back to the scaling, smoothing and averaging processor where the current depth map can be compared with previous maps, so it can be averaged over time to remove any abrupt depth transitions that may occur due to edits in the programming stream.

The locally generated graphics for compositing over the stereo content may be generated by the graphics processor and sent to the disparity offset processor. The disparity offset may be derived in real-time by extracting the values of the depth map for intended x,y coordinates of the graphical object and used to control the disparity of the stereo pairs of the graphical object when it is sent to the compositor. This may be done to ensure that the locally generated object will never be placed in depth behind an object in the 3D content for which it is to appear in front. The time averaging of the depth map may be used to ensure that the movements of the graphical object in depth space will be smooth, without any abrupt shifts as the background video changes with scene changes as shown below:

One non-limiting aspect of the present invention contemplates using a metadata approach where the graphical overlay position is defined prior to receipt of the stereoscope video. The metadata approach may be somewhat problematic as its predefined positioning, particularly with live content, may result in the graphical overlay automatically moving to forward and back as scenes change in the background without regard to actual movement of objects due to an inability to accurate ascertain object depths ahead of time. In the event object depth may be determined ahead of time, the metadata approach, in order to provide rich data necessary to enable placement anywhere on the screen at the appropriate depth, would incur a significant bandwidth penalty to deliver the large amount of data needed to generate the appropriate object depth information. Additionally, some most legacy systems in the transmission path may be incompatible with such metadata signals and would block this data from reaching the final display device, e.g., an HDMI cable is one example where this metadata would be interrupted.

Since the metadata approach can be visually disturbing and/or overly data intensive, one non-limiting aspect of the present invention contemplates locally generating graphical overlay position information through use of a multi-frame storage processing that averages time-domain transitions. This look-ahead buffer may be used to adjust the depth placement in anticipation of coming scene changes at a much reduced tracking rate, making it easier to view or read compared with the object that moves rapidly in Z-space. Accordingly, one non-limiting aspect of the present invention requires no separate transmission of depth metadata, but instead depends upon the local generation of this depth data as calculated in real-time from the left and right video signals by the final display device. This approach may preferred because the locally generated depth data can be filtered, processed and optimized by the same system which is generating the graphical overlays. In the metadata approach, the data will be filtered by the programmer without regard to the type or nature of the specific graphical overlay being inserted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for adaptive management of a graphical overlay within stereoscopic video comprising:
    generating a depth map for image frames used to form the stereoscopic video, the depth map using one or more depth lines for representing depth disparity for a plurality of objects appearing within the image frames, the depth lines varying in elevation to reflect corresponding parallax variances of a corresponding one of the objects over time;
    identifying a first segment, a second segment and a third segment for a first depth line of the one or more depth lines, the first depth line being associated with a first object of the plurality of objects, including identifying a beginning and an ending for each of the first segment, second segment and third segment;
    generating an first overlay line to represent depth of the graphical overlay relative to the first depth line, including shaping a first portion, a second portion and a third portion of the first overlay line such that the first portion extends from the beginning of the first segment to the ending of the first segment, the second portion extends from the beginning of the second segment to the ending of the second segment and the third portion extends from the beginning of the third segment to the ending of the third segment; and
    positioning a first graphical overlay within the stereoscopic video to track the first overlay line, thereby positioning the first graphical overlay relative to the first object within the stereoscopic video.

2. The method of claim 1 further comprising shaping the first portion, the second portion and the third portion as smooth lines having less undulations than the corresponding one of the first segment, the second segment and the third segment.

3. The method of claim 1 further comprising shaping the first portion, the second portion and the third portion as straight lines from the beginning to the ending of the corresponding one of the first segment, the second segment and the third segment.

4. The method of claim 1 further comprising shaping the first portion, the second portion and the third portion with a consistent slope from the beginning to the ending of the corresponding one of the first segment, the second segment and the third segment.

5. The method of claim 4 further comprising shaping the slope of at least one of the first portion, the second portion and the third portion to be different from the slope of at least another one of the first portion, the second portion and the third portion and such that each slope is either consistently increasing or decreasing.

6. The method of claim 1 further comprising generating the first portion, the second portion and the third portion to be above a tallest peak of the corresponding one of the first segment, the second segment and the third segment, thereby causing the first graphical overlay to appear in front of the first object in the stereoscopic video.

7. The method of claim 1 further comprising generating the first portion, the second portion and the third portion to be below a lowest peak of the corresponding one of the first segment, the second segment and the third segment, thereby causing the first graphical overlay to appear behind the first object in the stereoscopic video.

8. The method of claim 1 further comprising:
    identify a fourth segment, a fifth segment and a sixth segment for a second depth line of the one or more depth lines associated with a second object of the plurality of objects, including identifying a beginning and an ending for each of the fourth segment, fifth segment and sixth segment;
    generating an second overlay line to represent depth of the graphical overlay relative to the second depth line, including shaping a fourth portion, a fifth portion and a sixth portion of the second overlay line such that the fourth portion extends from the beginning of the fourth segment to the ending of the fourth segment, the fifth portion extends from the beginning of the fifth segment to the ending of the fifth segment and the sixth portion extends from the beginning of the sixth segment to the ending of the sixth segment; and
    positioning a second graphical overlay within the stereoscopic video to track the second overlay line, thereby positioning the second graphical overlay relative to the second object within the stereoscopic video.

9. The method of claim 8 further comprising simultaneously positioning the first graphical overlay and the second graphical overlay within the stereoscopic video.

10. The method of claim 1 further comprising:
    sampling a signal carrying the stereoscopic video to capture the image frames;
    generating the depth map from the sample of the signal;
    buffering the signal for a period of time sufficient for generating the depth map; and
    outputting the signal to a first device following the buffering and after the first graphical overlay is positioned therein, thereby enabling playback of the stereoscopic video with the first graphical overlay at the first device.

11. The method of claim 10 further comprising:
    buffering left video carried in the signal with a left buffer;
    buffering right video carried in the signal with a right buffer; and
    positioning the first graphical overlay within the left video following output from the left buffer and positioning the first graphical overlay within the right video following output from the right buffer to form the buffered signal enabling playback of the stereoscopic video with the first graphical overlay.

12. The method of claim 10 further comprising coordinating the period of time with a second device to avoid an application executing thereon from generating a spoiler, the spoiler resulting from the application presenting time-based information for a portion of the signal undergoing buffering prior to the portion being output to the first device.

13. The method of claim 12 further comprising transmitting a message to the second device to indicate the period of time, the message indicating timestamps associated with the image frames carried within the portion of the signal being buffered, the second device using the timestamps to avoid generating the spoiler.

14. The method of claim 1 further comprising:
determining a left viewpoint image and a right viewpoint image for the image frames from information carried within a signal being used to transport the stereoscopic video;
determining a desired amount of parallax for the first graphical overlay as a function of the depth lines;
defining a first location for the first graphical overlay within the left viewpoint video image and a second location for the first graphical overlay within the right viewpoint video image, the first and second locations each being different than predefined two-dimensional (2D) coordinates specified for the first graphical overlay within the information, the predefined 2D coordinates specifying an initial x positional value and an initial y positional value for placement of the first graphical overlay at a two-dimensional (2D) location within a screen of a device, the screen defined by an x-y coordinate system where an x-axis defines a width of the screen and a y-axis defines a height of the screen, the initial x positional value defining the 2D location of the first graphical overlay within the x-axis and the initial y positional value defining the 2D location of the graphical overlay within the y-axis;
generating the first graphical overlay for the left viewpoint video to appear at the first location within the x-y coordinate system and the graphical overlay for the right viewpoint video to appear at the second location within the x-y coordinate system such that:
i) the first location is different from the second location;
ii) the first location is different from the 2D location; and
iii) the second location is different from the 2D location; and
combining the first graphical overlay with each of the video frames such that a combination thereof forms at least part of a video feed used by the device to render the stereoscopic 3D video, including combining the first graphical overlay within each of the left and right viewpoint video frames at the correspondingly defined first and second locations.

15. The method of claim 1 further comprising:
generating the depth lines to include values to reflect the parallax variances over time, the values being mapped on a per-frame basis such that one of the values is mapped within the plurality of depth lines for each of the plurality of objects for each of the plurality of image frames; and
positioning the first graphical overlay within the signaling on a per-frame basis to track the first overlay line.

16. The method claim 1 further comprising:
receiving signaling representing the stereoscopic video at an input of a device;
operating a disparity detection controller executing on the device to facilitate:
i) capturing the image frames from the received signaling;
ii) generating the depth map; and
iii) identifying the first segment, the second segment and the third segment;
operating a disparity offset controller executing on the device to facilitate:
i) determining the first graphical overlay;
ii) generating the first overlay line; and
iii) generating positional information sufficient for positioning the first graphical overlay within the stereoscopic video being output from the device to track the first overlay line; and
operating a buffer controller executing on the device to facilitate:
i) a left buffer of the device positioning the first graphical overlay according to the positional information within a left video portion of the signaling; and
ii) a right buffer of the device positioning the first graphical overlay according to the positional information within a right video portion of the signaling; and
providing the left video portion and the right video portion from an output of the device to a display for viewing thereon of the stereoscopic video following positioning of the first graphical overlay therein.

17. The method of claim 1 further comprising determining the beginning and the ending of each section as a function of scene changes, the scene changes corresponding with depth changes of the first object exceeding a threshold as a measured from preceding images.

* * * * *